Aug. 1, 1967  L. P. BARKER, JR  3,333,359
FISH HOOK
Filed Feb. 11, 1965
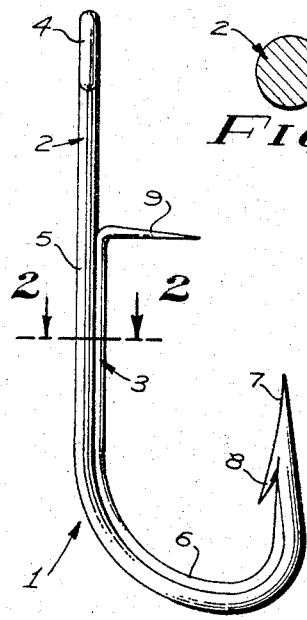
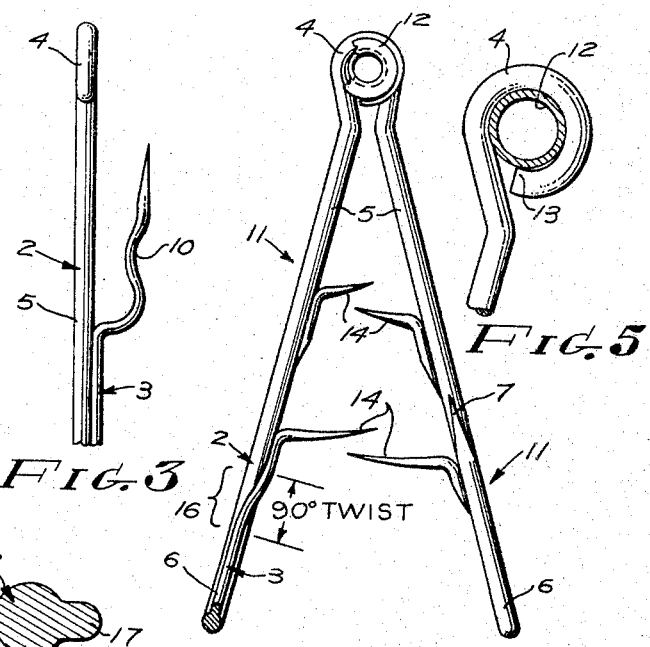
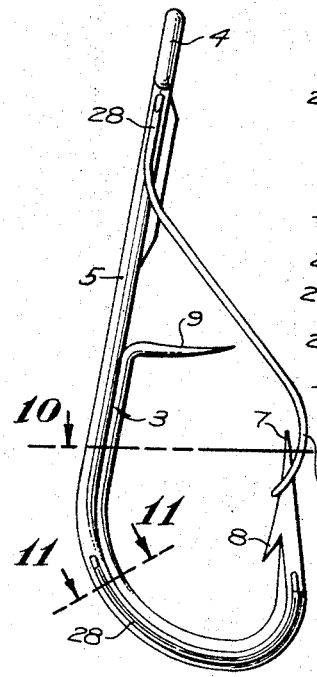
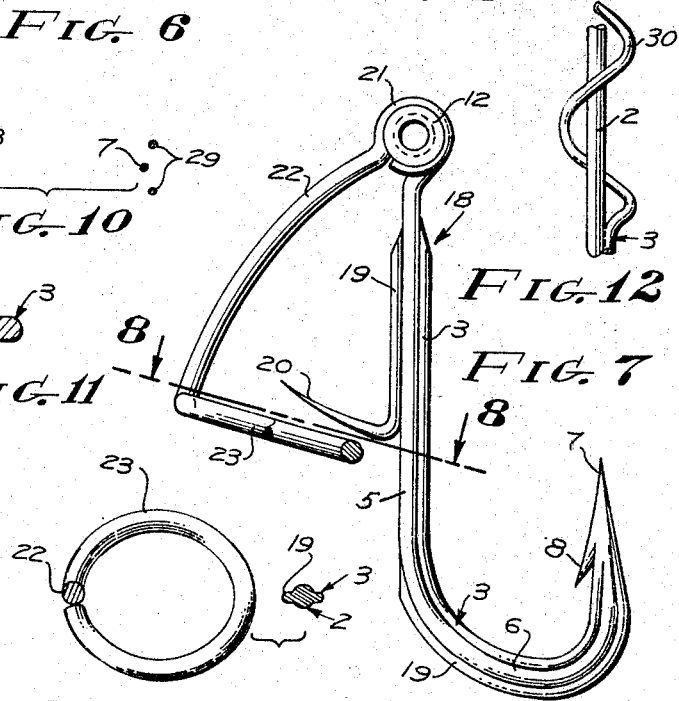
INVENTOR.
LUTHER PAUL BARKER JR
BY
Lyon & Lyon
ATTORNEYS

United States Patent Office 3,333,359
Patented Aug. 1, 1967

3,333,359
FISH HOOK
Luther Paul Barker, Jr., 8443 Broadway,
San Gabriel, Calif. 91776
Filed Feb. 11, 1965, Ser. No. 431,959
14 Claims. (Cl. 43—43.6)

This invention relates to fish hooks and included in the objects of this invention are:

First, to provide a fish hook which is formed of wire having an integral stiffening rib along one or more sides which reinforces the hook portion thereof and which provides material from which one or more barbs, impaling members or prongs may be formed without weakening the fish hook.

Second, to provide a fish hook of this type, which utilizes two fish hook shanks which may be pivotally connected, either one or both shanks being provided with one or more integral barbs or prongs so that the two shanks may be pressed toward each other to impale bait therebetween.

Third, to provide a fish hook construction having hinged shanks, which incorporates a novel hinge means permitting ready closure of the shanks but resisting spreading of the shanks so that bait may be retained between the shanks.

Fourth, to provide a fish hook construction, an embodiment of which is particularly adapted for use of live fish bait, and includes a bait retaining member hinged to the back side of a fish hook member, and a barb or prong projecting from the back side of the fish hook member to impale the head, body or tail of a bait fish inserted in the retaining member.

Fifth, to provide a fish hook construction, an embodiment of which incorporates one or more side ribs which are partially severed from the stem of the hook member, and curved so as to overlap the point of the hook member so as to serve as a weed guard.

With the above and other objects in view, as may appear hereinafter, reference is directed to the accompanying drawings in which:

FIGURE 1 is a side view showing one form of the fish hook.

FIGURE 2 is an enlarged transverse sectional view taken through 2—2 of FIGURE 1.

FIGURE 3 is a fragmentary side view showing a modified form of the fish hook.

FIGURE 4 is a side view of a further modified form of the fish hook wherein a pair of fish hook members are hinged together, one of the fish hook members being shown in section.

FIGURE 5 is an enlarged transverse sectional view of the hinge portion of the fish hook shown in FIGURE 4.

FIGURE 6 is an enlarged transverse sectional view similar to FIGURE 2 showing a modified form of the body member from which the fish hook is constructed.

FIGURE 7 is a side view of a further modified form of the fish hook intended to retain live bait.

FIGURE 8 is a transverse sectional view thereof taken through 8—8 of FIGURE 7.

FIGURE 9 is a side view of a further modified form of the fish hook which incorporates a weed guard.

FIGURE 10 is a transverse sectional view taken through 10—10 of FIG. 9.

FIGURE 11 is an enlarged transverse sectional view taken through 11—11 of FIG. 9.

FIGURE 12 is a fragmentary side view showing a modified construction of the fish hook shank having a helically coiled bait retaining element.

Reference is first directed to FIGURES 1 and 2. The fish hook member 1 herein illustrated includes a main body or rod 2 preferably of circular cross section. Formed along one side of the main body is an integral rib 3 which is narrower in cross section than the body. Initially, the rib is coextensive with the body member. The integral rib and body may be obtained by a forging operation on a rod of appropriate diameter, or by extrusion or rolling the rod to form a rib initially coextensive with the body member.

The rib 3 is severed from one end of the fish hook member and this end is curved to form an eyelet 4. Continuing from the eyelet 4 is a shank 5 which is joined to one end of an essentially U-shaped hook portion 6. The hook portion is bent in the common plane of the body 2 and the rib 3 as shown in FIGURE 1 so that the rib reinforces or stiffens the body member to withstand forces which would tend to straighten the hook portion. The stiffening of the hook portion is accomplished with a minimum of addition of material. In fact, substantially less material is used than if a rod equal in diameter to the maximum width of the body member and rib were used.

One end of the hook portion terminates in a sharp point 7. In place of forming the associated barb 8 from a portion of the main body in a conventional manner, the barb is preferably formed from the rib 3.

A portion of the rib which is severed from the shank is bent outwardly to form a shank barb or prong 9. The shank barb provides a means for impaling bait. The barb may be straight as shown in FIGURE 1 or may be contoured in the manner of the barb 10 shown in FIGURE 3. This construction of the barb or prong is particularly suited when worm or cellular bait is used. The point of the barb in this case extends essentially axially with respect to the shank 5.

Reference is now directed to FIGURE 4. In many cases it is desirable to connect several fish hook members together in order to form the fish hook structure. In FIGURE 4, a pair of fish hook members 11 is provided, each formed from a main body 2 and rib 3. Each fish hook member includes an eyelet 4, a shank 5, a hook portion 6 and point 7, with its point barb. The eyelets 4 of the two fish hook members are joined together by a hollow rivet 120. The eyelets are normally slightly smaller than the hollow rivet so that when joined, each eyelet is spread slightly so as to frictionally engage the rivet and offer predetermined resistance to pivotal movement.

In particular, it is desirable that the two shanks be movable toward each other with less friction than that required to separate them. In order to accomplish this, the extremity of each eyelet forms a rudimentary prong 13 which, when turned in a counterclockwise direction, as viewed in FIGURE 5, provides less frictional contact than when it is moved in a clockwise direction.

As in the first construction, the shanks of the fish hook structure shown in FIGURE 4 are provided with barbs or prongs, in this case opposed pairs of barbs or prongs 14 are provided. In order that the barbs project toward each other from their respective shanks, the lower portion of the shanks may be twisted 90° as indicated by 16. As in the first described structure, each of the barbs or prongs is formed by severing appropriate portions of the rib 3 from the main body 2.

In the type of fish hook structure shown in FIGURE 4, the hook portions may extend from the same side of their respective shanks, or may extend in opposite directions.

As an alternative to twisting the shank portions, the main body 2 of each fish hook member may be provided with a second rib 17 disposed 90° to the rib 3 as shown in FIGURE 6.

Reference is now directed to FIGURES 7 and 8. In this construction, a single fish hook member 18 is employed, which in this case is shown as provided with a second rib 19 extending in a direction diametrically opposite from the rib 3. The presence of both ribs further stiffens the hook portion 6. In addition, the second rib provides a means of forming a shank barb 20 which projects in a direction opposite from the hook portion 6, but in a plane common thereto.

Joined to the eyelet of the fish hook member 18 by means of a hollow rivet 12 is an eyelet 21 of a stem 22. In this case, the stem 22 is arched and terminates in fish retaining means which may be in the form of a relatively large loop 23, the axis of which is perpendicular to the axis of the loop 21. The shank barb or prong 20 is disposed between the loop 23 and the eyelet 21. The fish hook member 18 is employed by inserting the head of live bait into the loop 23 and impaling the head on the barb or prong 20. The eyelet 21 and the companion eyelet on the stem 22 may be provided with rudimentary prongs 13 as shown FIGURE 5 so that the stem 22 may be readily moved in a direction to impale the head of the live bait on the barb 20, but resist outward movement. For some purposes the loop may be omitted. Also while the barb and stem are shown on the back side of the fish hook member, they may be located on the front or hook side thereof.

Reference is now directed to the embodiment shown in FIGS. 9, 10 and 11, wherein use is made of additional ribs 28 located along opposite sides of the main body or rod 2. The ribs 28 may be smaller than the rib 3. A substantial length of each rib 28 is severed from the body 5 starting at a point near the eyelet 4 and curving outwardly and downwardly in overlapping relation with the point 7 to form a weed guard 29. The ribs may be spring-tempered so that they tend to remain in place, but deflect when a fish strikes the hook. Alternatively the weed guards may be pivotally connected to the eyelet 4 in the manner of the stem 22.

It should be observed that the barbs or prongs 14 and 20 particularly, have pointed ends which are closer to the pivotal axis of the stem or shank than their root ends. As a result the dragging force of bait, particularly live bait tends to impale the bait further on the barb or prong. When a pair of barbs or prongs impale the bait, as in FIG. 4, the dragging force of the bait tends to move the stems or shanks of the two hook members toward each other so that the bait is firmly held. This is true also with the arrangement shown in FIGURE 7.

Reference is directed to FIG. 12. The body 2 herein illustrated is provided with one or more ribs 3, or smaller ribs 28. Portions are severed from the shank to form one or more barbs or prongs which are helically coiled to form bait-retaining elements 30.

It will be noted that the several portions of the ribs shown in the different figures may be short pointed elements, such as 8 in FIG. 1, or longer pointed elements such as 9, 10, 14, or 20, shown in other figures, or still longer unpointed elements such as 29 or 30. Thus the term "barb" or "prong" as herein used is not intended to be limited to a short pointed element but may include elongated pointed or unpointed elements formed by several portions of the ribs.

While particular embodiments of the invention have been shown and described, it is not intended to limit the same to the details of the construction set forth, but, instead, the invention embraces such changes, modifications and equivalents of the various parts and their relationships as come within the purview of the appended claims.

I claim:
1. A fish hook comprising:
 (a) a main body member of uniform cross section;
 (b) an integral rib having a width less than said body member, said rib disposed at one side thereof and extending longitudinally with respect to said body member, at least a portion of said rib defining a plane common to the axis of said body member;
 (c) said portion and body member being bent in said plane to form a hook and said rib thereby stiffening and reinforcing said hook to resist straightening;
 (d) one end of said hook terminating in a sharp point;
 (e) said body member including a shank continuing from the other end of said hook;
 (f) and at least one barb formed of a portion of said rib severed from said shank, said body member retaining its uniform cross section.
2. A fish hook as set forth in claim 1, wherein:
 (a) said barb extends from said shank towards said sharp point.
3. A fish hook as set forth in claim 1, wherein:
 (a) said barb is helically coiled about said shank.
4. A fish hook as set forth in claim 1, wherein:
 (a) said barb projects laterally from said shank;
 (b) and a stem is pivotally connected to the extremity of said shank for movement toward said shank barb for cooperation to hold bait on said shank.
5. A fish hook as set forth in claim 4, wherein:
 (a) said stem forms the shank of a second similar fish hook and includes at least one barb projecting toward the barb on the shank of the first fish hook.
6. A fish hook as set forth in claim 1, wherein:
 (a) said body member is provided with at least one additional rib partially severed therefrom and curved into overlapping relation with the point end of said hook portion to form a guard therefor.
7. A fish hook as set forth in claim 4, wherein:
 (a) said shank barb is in a plane common to said hook portion and is disposed on the opposite side of said shank from said hook portion;
 (b) and said stem terminates in a bait holding means movable toward said barb for cooperation therewith.
8. A fish hook as set forth in claim 1, wherein:
 (a) said barb projects laterally from said shank;
 (b) and a stem is pivotally connected to the extremity of said shank;
 (c) said pivotal connection includes eyelets at the extremities of said stem and shank, a hollow rivet joining said eyelets, and the extremities of said eyelets form prongs yieldably engaging said rivet to facilitate movement of each eyelet in one direction about said rivet and resist movement in the opposite direction whereby said stem is readily movable toward said shank and barb and resists movement away from said shank and barb.
9. In a fish hook having a hook portion, a point at one end thereof, and a shank at the other end thereof terminating in an eyelet, the combination of:
 (a) an integral longitudinally extending rib initially extending the length of said hook portion and shank at one side thereof;
 (b) said rib, hook portion and shank formed in one piece;
 (c) at least one portion of said rib being severed from said shank, extended laterally therefrom and pointed to form a barb, the remaining portion of said rib forming a reinforcing element for said hook portion and shank.
10. A fish hook structure comprising:
 (a) a pair of shank members having eyelets;
 (b) means pivotally connecting said eyelets;
 (c) at least one of said shanks having a hooked and barb pointed extremity;
 (d) an integral longitudinally extending rib initially extending the length of said hook portion and shank at one side thereof;
 (e) said rib, hook portion and shank formed in one piece;
 (f) at least one portion of said rib being severed from said shank, extended laterally therefrom and pointed to form a barb, the remaining portion of said rib forming a reinforcing element for said hook portion and shank.

11. A fish hook structure as set forth in claim 10, wherein:
   (a) both of said shanks have said integral ribs, the barb formed by the rib of one shank being directed toward the other shank;
   (b) said eyelets having extremities cooperating with said pivotal connecting means to offer greater resistance to pivotal movement when said shanks are pivoted away from each other than when said shanks are pivoted toward each other.

12. A fish hook structure as set forth in claim 10, wherein:
   (a) one of said shanks terminates in a loop to receive bait therein and cooperates with the barb of the other shank to retain bait in said loop.

13. A fish hook structure as set forth in claim 10, wherein:
   (a) each of said shanks have a barb formed from the rib;
   (b) the points of said barbs are located closer to the pivotal axis of said eyelets than their attached ends.

14. A fish hook structure, comprising:
   (a) a hook portion, one end terminating in a barbed point;
   (b) a shank extending from the other end of said hook portion and terminating in an eyelet;
   (c) said shank having at least one integral rib extending longitudinally thereof, a portion of said rib being severed from said shank and curved into overlapping relation with said barbed point to form a yieldable guard therefor, the remaining portion of said rib being attached to said hook portion and forming a reinforcing element.

References Cited

UNITED STATES PATENTS

| | | | |
|---|---|---|---|
| 390,028 | 9/1888 | Loftie | 43—42.43 X |
| 741,916 | 10/1903 | Krus | 43—43.6 |
| 778,875 | 1/1905 | Mathews | 43—43.2 |
| 831,552 | 9/1906 | Hallstrom | 43—44.8 X |
| 2,618,097 | 11/1952 | Johnstone | 43—44.8 |
| 2,626,439 | 1/1953 | Mack. | |
| 2,962,834 | 12/1960 | Stinson | 43—44.8 X |
| 3,034,250 | 5/1962 | Laba | 43—44.8 |

FOREIGN PATENTS 490,356    2/1953    Canada.

SAMUEL KOREN, *Primary Examiner.*

D. J. LEACH, *Assistant Examiner.*